US007753638B2

(12) United States Patent
Ishiyama

(10) Patent No.: US 7,753,638 B2
(45) Date of Patent: Jul. 13, 2010

(54) ROBOT HAND HAVING SWAYING MECHANISM IN LIBRARY APPARATUS

(75) Inventor: Kazunori Ishiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/383,344

(22) Filed: May 15, 2006

(65) Prior Publication Data
US 2007/0196197 A1    Aug. 23, 2007

(30) Foreign Application Priority Data
Feb. 22, 2006   (JP)   ............... 2006-045005

(51) Int. Cl.
*B65G 1/06*   (2006.01)
(52) U.S. Cl. .................. 414/280; 414/277; 901/12; 901/39
(58) Field of Classification Search .......... 414/277, 414/280; 901/12, 30, 31, 39; 294/99.1
See application file for complete search history.

(56) References Cited

U.S. PATENT DOCUMENTS

| 4,132,318 | A | * | 1/1979 | Wang et al. ............... 414/591 |
| 4,344,729 | A | * | 8/1982 | Orsinger et al. ......... 414/226.02 |
| 4,466,765 | A | * | 8/1984 | Mautino ................... 414/277 |
| 4,815,055 | A | * | 3/1989 | Fago, Jr. ................. 369/30.43 |
| 4,827,463 | A | * | 5/1989 | Motoyoshi et al. ....... 369/30.43 |
| 4,904,153 | A | * | 2/1990 | Iwasawa et al. ........... 414/735 |
| 4,913,617 | A | * | 4/1990 | Nicholson ................ 414/729 |
| 5,379,229 | A | * | 1/1995 | Parsons et al. ............ 700/215 |
| 5,449,262 | A | * | 9/1995 | Anderson et al. .......... 414/280 |
| 5,544,146 | A | * | 8/1996 | Luffel et al. ............. 369/30.45 |
| 5,691,859 | A | * | 11/1997 | Ulrich et al. .............. 360/92 |
| 5,805,561 | A | * | 9/1998 | Pollard .................. 369/30.43 |
| 5,848,872 | A | * | 12/1998 | Manes et al. ............ 414/753.1 |
| 5,954,446 | A | * | 9/1999 | Ireland .................... 403/11 |

(Continued)

FOREIGN PATENT DOCUMENTS

JP    6-52611    2/1994

(Continued)

OTHER PUBLICATIONS

Definition of "forefront" from http://www.thefreedictionary.com/p/forefront.*

(Continued)

*Primary Examiner*—Michael S Lowe
(74) *Attorney, Agent, or Firm*—Staas & Halsey LLP

(57) ABSTRACT

A library apparatus includes cells. A positioning mechanism serves to position a carriage relative to the cells within an operating region adjacent to a standby region. A transporting mechanism drives the carriage toward the standby region. A swaying mechanism allows grasping fingers on the carriage to go around an object lying on the movement path of the grasping fingers when the transporting mechanism carries the carriage to the standby region. The grasping fingers acts to hold an object within the cell. If the positioning mechanism malfunctions, the transporting mechanism transfers the carriage to the standby region. Even if an object exits on the movement path of the grasping finger, the carriage is allowed to keep moving because the swaying mechanism allows the grasping finger or fingers to sway around the object on the movement path. The carriage thus reliably reaches the standby region.

2 Claims, 13 Drawing Sheets

U.S. PATENT DOCUMENTS

| | | | |
|---|---|---|---|
| 6,309,162 B1 * | 10/2001 | White | 414/273 |
| 6,512,653 B1 * | 1/2003 | Sasaki et al. | 360/92.1 |
| 6,778,351 B1 * | 8/2004 | Coffin et al. | 360/92.1 |
| 7,106,538 B2 | 9/2006 | Minemura et al. | |
| 7,231,278 B2 * | 6/2007 | Ngo | 700/213 |
| 2002/0012579 A1 | 1/2002 | White | |
| 2004/0091339 A1 * | 5/2004 | Arnal et al. | 414/280 |
| 2006/0023335 A1 | 2/2006 | Minemura et al. | |

FOREIGN PATENT DOCUMENTS

| | | |
|---|---|---|
| JP | 7-32729 | 6/1995 |
| JP | 8-195013 | 7/1996 |
| JP | 2618395 | 3/1997 |
| JP | 10-134460 | 5/1998 |
| JP | 2000-348417 | 12/2000 |
| JP | 2006-40450 | 2/2006 |

OTHER PUBLICATIONS

Office Action mailed on Nov. 4, 2008 and issued in corresponding Japanese Patent Application No. 2006-045005.

* cited by examiner

ROBOT HAND HAVING SWAYING MECHANISM IN LIBRARY APPARATUS

BACKGROUND OF THE INVENTION

1. Field of the Invention

The present invention relates to a library apparatus such as a magnetic tape library apparatus, for example. In particular, the present invention relates to a robot hand capable of accessing to a cell containing an object such as a magnetic tape cartridge in the library apparatus.

2. Description of the Prior Art

The robot hand is positioned at a specific position corresponding to one of cells within an operating region adjacent to a standby region in the magnetic tape library apparatus. Grasping fingers are mounted on the robot hand. The grasping fingers grasp a magnetic tape cartridge within the cell. The robot hand is designed to transport a magnetic tape cartridge in the magnetic tape library apparatus.

When the robot hand malfunctions, the robot hand is transferred to the standby region. A cell or a magnetic tape cartridge lying on the movement path of the grasping fingers may interfere with the transfer of the robot hand. The robot hand cannot in this case reach the standby position. The robot hand in malfunction prevents a backup robot hand from moving within the operating region, for example. Redundancy cannot be established.

SUMMARY OF THE INVENTION

It is accordingly an object of the present invention to provide a library apparatus capable of reliably allowing a robot hand to reach a standby region.

According to the present invention, there is provided a library apparatus comprising: a storage box including cells; a carriage; a positioning mechanism designed to position the carriage at positions corresponding to the cells within an operating region adjacent to a predetermined standby region; a pair of grasping fingers mounted on the carriage, the grasping fingers allowed to get closer to and distanced from each other along a horizontal plane; a transporting mechanism driving the carriage toward the standby region; and a swaying mechanism allowing the grasping fingers to go around an object lying on the movement path of the grasping fingers when the transporting mechanism carries the carriage to the standby region.

The library apparatus normally allows the positioning mechanism to position the carriage at the positions corresponding to the cells. The grasping fingers acts to hold an object within the cell. The carriage serves to transport the object. If the positioning mechanism malfunctions, the transporting mechanism takes the place of the positioning mechanism for transportation of the carriage to the standby region. Even if there is an object on the movement path of the grasping finger, the carriage is allowed to keep moving because the swaying mechanism allows the grasping finger or fingers to sway around the object on the movement path. The carriage thus reliably reaches the standby region.

The transporting mechanism may comprise: a backup carriage; and a backup positioning mechanism designed to position the backup carriage at positions corresponding to the cells within the operating region. The transporting mechanism allows the backup carriage to operate while the aforementioned carriage is inoperative. The backup carriage serves to transport the objects within the cells. The library apparatus thus keeps operating without any interruption.

The library apparatus may further comprise: a support member mounted on the carriage, the support member moving in the longitudinal direction along a plane between a foremost position and a rearmost position; a support shaft mounted on the support member, the support shaft coupling the grasping fingers to the support member for relative rotation around the rotation axis extending along the plane in the lateral direction perpendicular to the longitudinal direction; and a driving mechanism mounted on the support member, the driving mechanism allowing the grasping fingers to get closer to and distanced from each other in the lateral direction. The library apparatus allows the grasping fingers to catch the object when the support member is set at the foremost position. The object is then taken into the carriage. The carriage can thus transport the object.

In this case, the library apparatus may further comprise: an elastic member exhibiting a driving force allowing the grasping finger to swing around the support shaft in a specific direction; and a stop designed to position the tip end of the grasping finger at a foremost position in the longitudinal direction when the stop receives the grasping finger rotating in the specific direction. When the stop restricts the rotation of the grasping finger, the grasping finger is forced to take the reference attitude. The tip end of the grasping finger is positioned farthest in the forward direction. When the grasping finger collide against an object on its movement path, the grasping finger rotates around the rotation axis against the elasticity of the elastic member. The grasping fingers is thus allowed to sway around the object. The elasticity of the elastic member serves to keep the grasping finger at the reference attitude unless the grasping finger collide with an object. The grasping fingers are allowed to normally catch the object within the cell. The aforementioned swaying mechanism can be realized in a facilitated manner.

A specific robot hand may be provided to realize the library apparatus. The robot hand may comprise: a carriage; a support member mounted on the carriage, the support member moving in the longitudinal direction along a plane between a foremost position and a rearmost position; a pair of grasping fingers mounted on the support member, the grasping fingers spaced from each other along the plane in the lateral direction perpendicular to the longitudinal direction; a driving mechanism mounted on the support member, the driving mechanism allowing the grasping fingers to get closer to each other in the lateral direction; and a swaying mechanism mounted on the support member, the swaying mechanism allowing the rotation of the grasping finger around the rotation axis extending in the lateral direction. In this case, the swaying mechanism may comprise: a support shaft extending in the lateral direction, the support shaft supporting the grasping finger for relative rotation; an elastic member exhibiting a driving force allowing the grasping finger to rotate around the support shaft in a specific direction; and a stop designed to position the tip end of the grasping finger at a foremost position in the longitudinal direction when the stop receives the grasping finger rotating in the specific direction.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
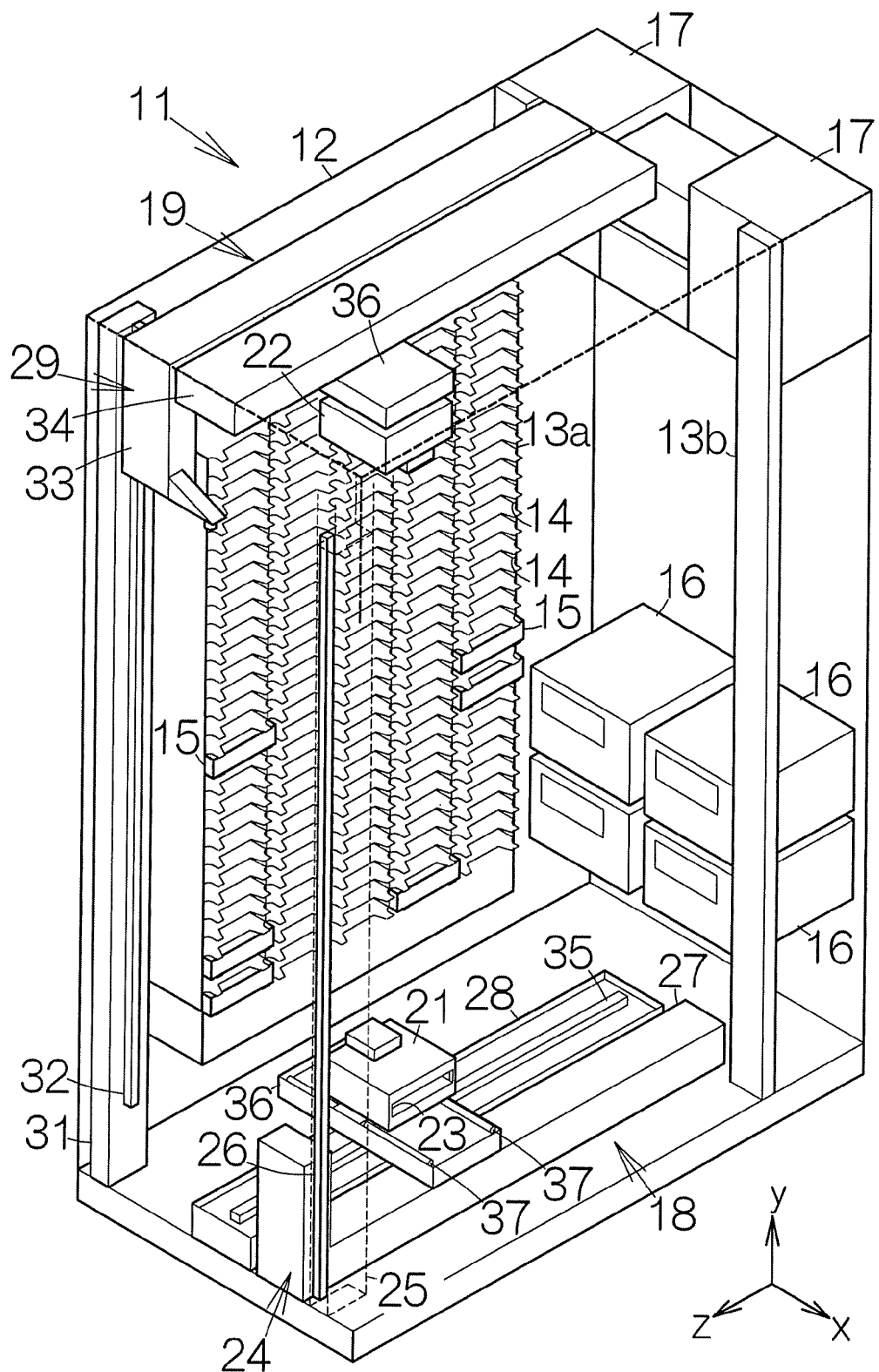
FIG. 1 is a perspective view schematically illustrating the structure of a magnetic tape library apparatus.

FIG. 1 schematically illustrates the structure of a magnetic tape library apparatus 11 according to an embodiment of the present invention. The magnetic tape library apparatus 11 includes a box-shaped enclosure 12. The enclosure 12 defines an inner space in the form of a parallelepiped standing upright from the floor, for example. Storage boxes 13a, 13b are placed within the inner space of the enclosure 12. A pair of storage boxes 13a, one of them not shown, is located at opposite sides of a predetermined central space in the form of a parallelepiped. Each of the storage boxes 13a includes cells 14, 14, .... The openings of the cells 14, 14, ... are arranged along planes perpendicular to the floor, namely side surfaces of the central space. An object or recording medium such as a magnetic tape cartridge 15 is contained in the individual cell 14. A linear tape-open (LTO) cartridge may be employed as the magnetic tape cartridge 15, for example.

The storage box 13b is placed at a position adjacent to the central space between the storage boxes 13a, 13a. Four, for example, recording medium drives such as magnetic tape drives 16 are placed in the storage box 13b. The magnetic tape drives 16 respectively include slots arranged along a plane perpendicular to the floor, namely a side surface of the central space. The magnetic tape drive 16 is designed to write magnetic information data into a magnetic recording tape inside the magnetic tape cartridge 15. The magnetic tape drive 16 is also designed to read out magnetic information data out of the magnetic recording tape inside the magnetic tape cartridge 15. The magnetic tape cartridge 15 is inserted into and withdrawn from the magnetic tape drive 16 through the slot. The magnetic recording tape is unwound from a reel within the magnetic tape cartridge 15 in the magnetic tape drive 16. The unwound magnetic recording tape is then wound around a reel within the magnetic tape drive 16.

Here, an xyz-coordinate system is defined in the central space. The y-axis of the xyz-coordinate system is set perpendicular to the floor. The cells 14 in the storage boxes 13a are arranged in rows in the vertical direction in parallel with the y-axis. The z-axis of the xyz-coordinate system is set to extend in the horizontal direction in parallel with the storage boxes 13a. The z-axis thus extends across the rows of the cells 14 in the storage boxes 13a in the horizontal direction. The x-axis of the xyz-coordinate system is set to extend in the horizontal direction in parallel with the storage box 13b. The x-axis thus extends across the magnetic tape drives 16 in the storage box 13b in the horizontal direction.

Two, for example, containers 17, 17 are placed within the inner space of the enclosure 12. One of the containers 17 contains a library controller board and a first controller board therein. The other of the containers 17 likewise contains a second controller board. An external host computer, not shown, is connected to the library controller board. Various processings are effected at the library controller board as well as the first and second controller boards based on data and/or instructions supplied from the host computer.

First and second transporting robots 18, 19 are placed within the central space in the enclosure 12. The first and second transporting robots 18, 19 include first and second robot hands 21, 22, respectively. The first and second robot hands 21, 22 are individually designed to move relative to the first and second storage boxes 13a, 13b. The first and second robot hands 21, 22 enable transportation of the magnetic tape cartridges 15 between the cells 14 and the magnetic tape drives 16. The first and second robot hands 21, 22 are designed to take the magnetic tape cartridge 15 out of the slot of the magnetic tape drive 16 for the transportation. The first and second robot hands 21, 22 are designed to oppose own slots 23 to the openings of the cells 14 for handing and receiving the magnetic tape cartridge 15 to and from the cells 14. Likewise, the slots 23 of the first and second robot hands 21, 22 are allowed to get opposed to the slots of the respective magnetic tape drives 16. The first and second robot hands 21, 22 will be described later in detail.

A positioning mechanism 24 is connected to the first robot hand 21 in the first transporting robot 18. The positioning mechanism 24 includes a support member or a first support column 25 standing upright from the floor. A first rail 26 is coupled to the first support column 25. The first rail 26 extends in the vertical direction. A support body or a guide member 27 is coupled to the first rail 26. A first rail base 28 is coupled to the guide member 27. The guide member 27 and the first rail base 28 extend in the horizontal direction in parallel with the storage boxes 13a. The first rail base 28 is positioned at an intermediate position equally spaced from the storage boxes 13a, 13a.

The guide member 27 and the first rail base 28 are allowed to move upward and downward along the first rail 26 in parallel with the y-axis. A driving mechanism is connected to the guide member 27 for the upward and downward movement. The driving mechanism may include a belt coupled to the guide member 27 at the tip end, and a hoist designed to wind up the belt, for example. A power source such as an electric motor is incorporated in the hoist, for example. A stepping motor may be utilized as the electric motor, for example. The electric motor is referred to as "y-axis electric motor" hereinafter, for example.

Likewise, a positioning mechanism 29 is connected to the second robot hand 22 in the second transporting robot 19. The positioning mechanism 29 includes a support member or a second support column 31 standing upright from the floor. A first rail 32 is coupled to the second support column 31. The first rail 32 extends in the vertical direction. A support body or a guide member 33 is coupled to the first rail 32. A first rail base 34 is coupled to the guide member 33. The guide member 33 and the first rail base 34 extend in the horizontal direction in parallel with the storage boxes 13a. The first rail base 34 is positioned at an intermediate position equally spaced from the storage boxes 13a, 13a.

The guide member 33 and the first rail base 34 are allowed to move upward and downward along the first rail 32 in parallel with the y-axis in the same manner as the guide member 27 and the first rail base 28. A driving mechanism is connected to the guide member 33 for the upward and downward movement. The driving mechanism may include a belt coupled to the guide member 33 at the tip end, and a hoist designed to wind up the belt, for example. A power source such as an electric motor is incorporated in the hoist, for example. A stepping motor may be utilized as the electric motor, for example. The electric motor is referred to as "y-axis electric motor" hereinafter, for example. The guide members 27, 33 and the first rail bases 28, 34 are arranged in the vertical direction along the y-axis. The first rail base 34 of the second transporting robot 19 moves in the vertical direction above the first rail base 28 of the first transporting robot 18.

A second rail 35 is incorporated within each of the first rail bases 28, 34. The second rail 35 extends in the horizontal direction in parallel with the storage boxes 13a. A second rail base 36 is coupled to the second rail 35. The second rail base 36 extends in the horizontal direction in parallel with the storage box 13b. The second rail base 36 moves in the horizontal direction along the second rail 35 in parallel with the z-axis. A driving mechanism is connected to the second rail base 36 for the horizontal movement. The driving mechanism may include an endless belt wound around a pair of pulleys on the first rail base 28, 34, and a power source establishing a driving force to drive one of the pulleys for rotation, for example. The endless belt may be coupled to the second rail base 36. An electric motor may be utilized as the power source. A stepping motor may be employed as the electric motor, for example. The electric motor is referred to as "z-axis electric motor" hereinafter, for example.

A pair of third rails 37, 37 is fixed in the individual second rail base 36. The third rails 37 extend in the horizontal direction in parallel with the storage box 13b. The first and second robot hands 21, 22 are respectively coupled to the corresponding pair of the third rails 37. The first and second robot hands 21, 22 are thus allowed to move in the horizontal direction along the third rails 37 in parallel with the x-axis. The first and second robot hands 21, 22 are also allowed to rotate on the third rails 37 around a rotation axis parallel to a vertical axis or the y-axis. A pedestal, not shown, is coupled to each pair of the third rails 37, 37 for the horizontal movement and the rotation. The pedestal is allowed to move in the horizontal direction along the third rails 37, 37 in parallel with the x-axis. A driving mechanism is connected to the pedestal for the horizontal movement. The driving mechanism may include an endless belt wound around a pair of pulleys on the second rail base 36, and a power source establishing a driving force to drive one of the pulleys for rotation, for example. The endless belt may be coupled to the pedestal. An electric motor may be utilized as the power source. A stepping motor may be employed as the electric motor, for example. The electric motor is referred to as "x-axis electric motor" hereinafter, for example. The first and second robot hands 21, 22 are mounted on the pedestals, respectively. The first and second robot hands 21, 22 are coupled to the pedestals for relative rotation around the vertical axis, respectively. A driving mechanism is connected to each of the first and second robot hands 21, 22 for the relative rotation. The driving mechanism may include an endless belt wound around a rotation shaft of the first or second robot hand 21, 22 and a pulley on the pedestal, and a power source establishing a driving force to drive the pulley for rotation, for example. An electric motor may be utilized as the power source. A stepping motor maybe employed as the electric motor, for example. The electric motor is referred to as "revolution electric motor" hereinafter, for example.

The magnetic tape library apparatus 11 utilizes the coordinates in the xyz-coordinate system and the angle around the rotation axis to identify the position of the individual cell 14. The first and second robot hands 21, 22 in the first and second transporting robots 18, 19 are positioned in accordance with the coordinates of the xyz-coordinate system. The attitude or direction of the first and second robot hands 21, 22 is determined in accordance with the angle of rotation around the vertical axis. The first controller board determines the position and the rotation of the first robot hand 21 in accordance with the coordinates and the angle of rotation set for the individual cell 14. Likewise, the second controller board determines the position and the rotation of the second robot hand 22 in accordance with the coordinates and the angle of rotation set for the individual cell 14. The first and second robot hands 21, 22 are in this manner allowed to oppose the slots 23 to the openings of the corresponding cells 14 with a higher accuracy, respectively.

Figure 2:
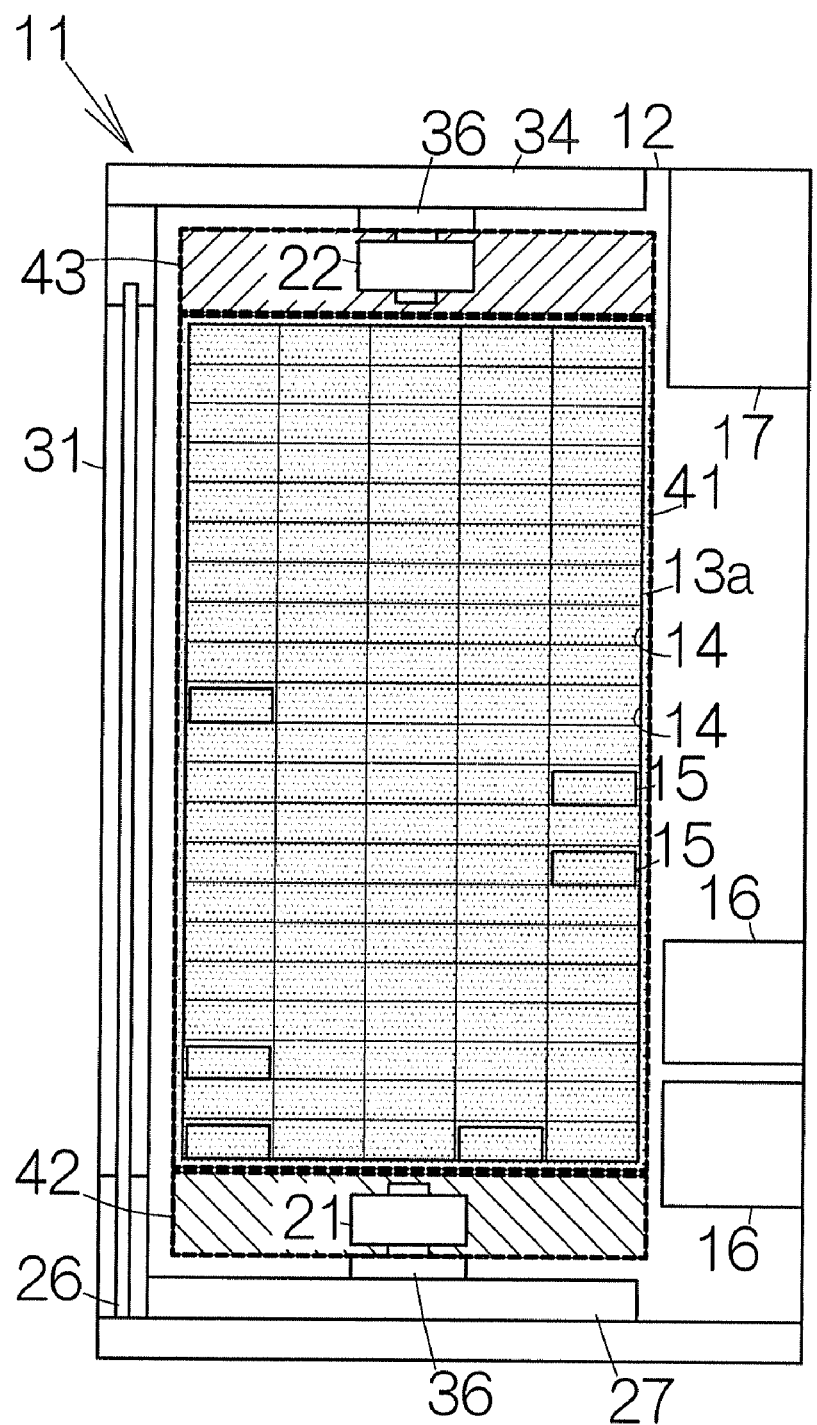
FIG. 2 is a side view of the magnetic tape library apparatus for schematically illustrating the movement regions of first and second robot hands.

As shown in FIG. 2, the first and second robot hands 21, 22 are positioned at positions corresponding or opposed to the cells 14, 14, . . . within an operating region 41. Each of the first and second robot hands 21, 22 is allowed to oppose the slot 23 to a specific one of the cells 14, 14, . . . within the operating region 41. Standby regions 42, 43 are provided for the first and second robot hands 21, 22 in the magnetic tape library apparatus 11, respectively. The second robot hand 22 is designed to use the standby region 43 located adjacent to the uppermost limit of the operating region 41. The second transporting robot 19 allows the first rail base 34 to take the uppermost position on the first rail 32 when the second robot hand 22 is positioned within the standby region 43. When the second robot hand 22 in this manner gets out of the operating region 41, the first robot hand 21 can thus be positioned at a position corresponding to any of the cells 14 within the operating region 41. The movement region of the second robot hand 22 thus extends over the operating region 41 and the standby region 43.

Likewise, the first robot hand 21 is designed to use the standby region 42 located adjacent to the lowermost limit of the operating region 41. The first transporting robot 18 allows the first rail base 28 to take the lowermost position on the first rail 26 when the first robot hand 21 is positioned within the standby region 42. When the first robot hand 21 in this manner gets out of the operating region 41, the second robot hand 22 can thus be positioned at a position corresponding to any of the cells 14 within the operating region 41. The movement region of the first robot hand 21 thus extends over the operating region 41 and the standby region 42. In this case, since the storage boxes 13a, 13b are located closer to each other in the magnetic tape library apparatus 11, a specific combination of the coordinates and angle of rotation causes the first and second robot hands 21, 22 to contact with the storage boxes 13a, 13b. Such a combination of the coordinates and angle of rotation is excluded from the movement regions of the first and second robot hands 21, 22, respectively.

The magnetic tape library apparatus 11 normally allows the first transporting robot 18 to operate in accordance with instructions from the library controller board. The first robot hand 21 transports the magnetic tape cartridge 15 between the cells 14, 14, . . . and the magnetic tape drives 16, 16, . . . . When the first robot hand 21 malfunctions, for example, the library controller board causes the second transporting robot 19 to start operating. The guide member 33 and the first rail base 34 of the second transporting robot 19 are driven downward along the first rail 32. In this case, the first rail base 28 and the guide member 27 of the first transporting robot 18 are disengaged from the driving mechanism on the first rail 26. When the guide member 33 contacts with the guide member 27 of the first transporting robot 18, for example, the driving force of the guide member 33 serves to urge the first rail base 28 and the guide member 27 downward along the first rail 26. When the guide member 33 and the first rail base 34 of the second transporting robot 19 reaches the lowermost limit of the operating region 41, the first rail base 28 of the first transporting robot 18 is positioned at the lowermost limit of the movement region. The first robot hand 21 is in this manner transferred into the standby region 42. The second robot hand 22 then contributes to transportation of the magnetic tape cartridges 15 between the cells 14, 14, . . . and the magnetic tape drives 16, 16, . . . in place of the first robot hand 21. As long as the second robot hand 22 moves within the operating region 41, the second transporting robot 19 is reliably prevented from interference with the first transporting robot 18. Here, the second transporting robot 19 functions as a transporting mechanism according to the present invention.

Repair can be effected on the first transporting robot 18 during the operation of the second transporting robot 19. The first robot hand 21 may be replaced with a new one in the first transporting robot 18, for example. The first transporting robot 18 may take the place of the second transporting robot 19 immediately after the replacement of the first robot hand 21. Alternatively, the second transporting robot 19 may be kept operating even after the replacement of the first robot hand 21. If the second robot hand 22 malfunctions during the operation of the second transporting robot 19, the first transporting robot 18 serves to drive the second robot hand 22 into the standby region 43 in the same manner as described above. The first robot hand 21 then takes the place of the second robot hand 22. As long as the first robot hand 21 moves within the operating region 41, the first transporting robot 18 is reliably prevented from interference with the second transporting robot 19. In this case, the first transporting robot 18 functions as a transporting mechanism according to the present invention.

Figure 3:
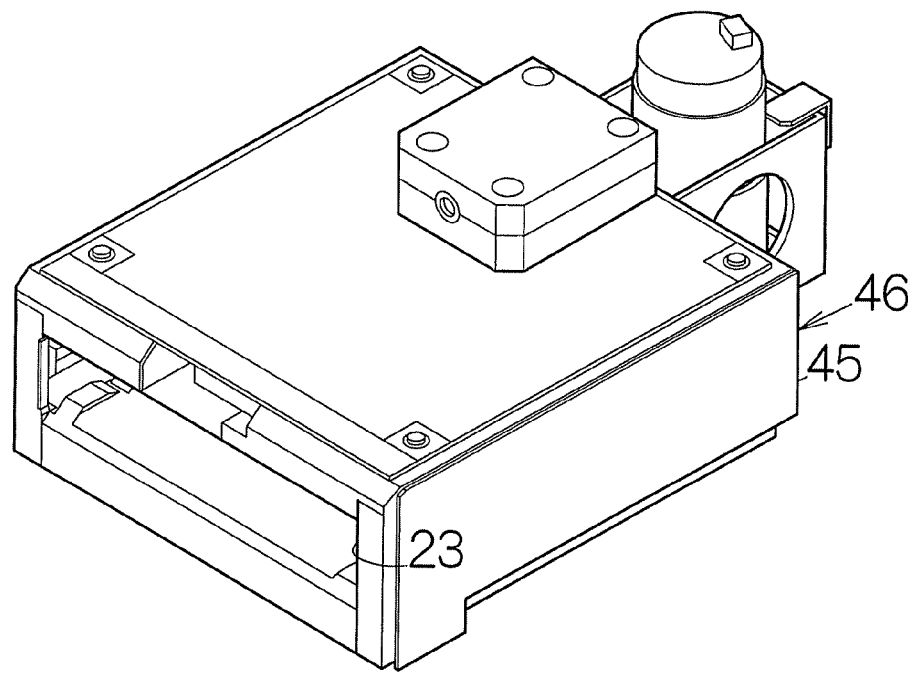
FIG. 3 is an enlarged perspective view of the first or second robot hand.
Figure 4:
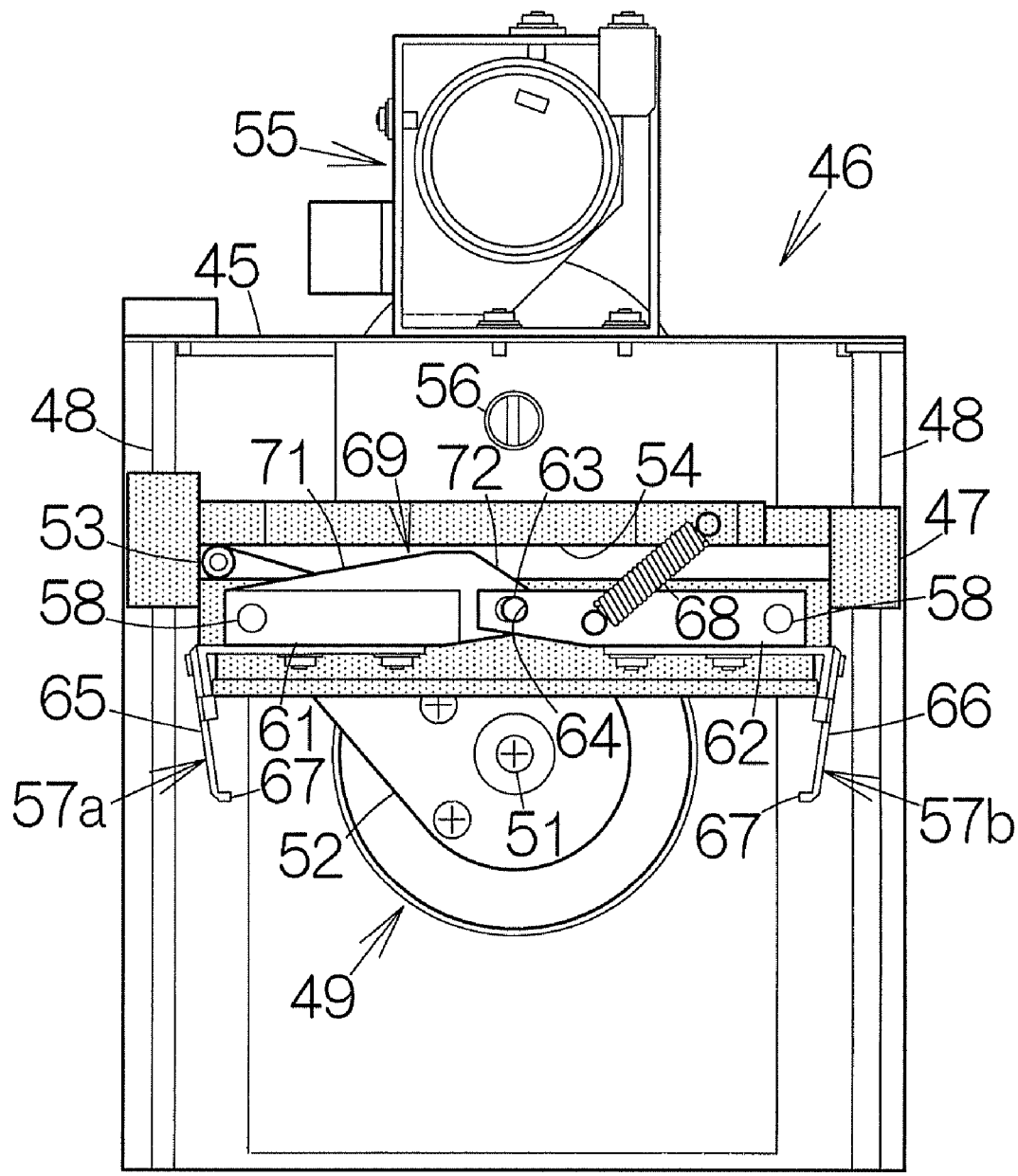
FIG. 4 is a plan view schematically illustrating the structure of the first or second robot hand.

A detailed description will be made on the first robot hand 21. As shown in FIG. 3, the first robot hand 21 includes a carriage 46 defining a box-shaped enclosure 45. The aforementioned slot 23 is defined in the front wall of the enclosure 45. As shown in FIG. 4, a support member 47 is placed within the enclosure 45 of the carriage 46. The support member 47 is coupled to a pair of guiding shafts 48. The guiding shafts 48 extend in parallel with each other in the longitudinal direction along a plane, namely a horizontal plane. The guiding shafts 48 serve to guide the longitudinal movement of the support member 47. The support member 47 extends in the lateral direction perpendicular to the longitudinal direction within the horizontal plane between the guiding shafts 48.

A driving mechanism 49 is connected to the support member 47. The driving mechanism 49 includes a revolutionary member 52 rotating around a vertical shaft 51 perpendicular to the horizontal plane. A small shaft 53 is placed on the revolutionary member 52 at a position distanced from the vertical shaft 51 in the horizontal direction. The small shaft 53 moves on a circular orbit around the vertical shaft 51 along the horizontal plane during the rotation of the revolutionary member 52. In other words, the small shaft 53 is kept distanced from the vertical shaft 51 at a certain interval during the movement.

An elongated opening 54 is formed in the support member 47. The elongated opening 54 extends in the lateral direction along the horizontal plane. The elongated opening 54 receives the small shaft 53 on the revolutionary member 52. The support member 47 is in this manner related to the revolutionary member 52. The overall length of the elongated opening 54 is set equal to or larger than the diameter of the circular orbit.

A power source such as an electric motor 55 is connected to the revolutionary member 52. A driving force is supplied to the revolutionary member 52 from the electric motor 55. A belt drive, a gear mechanism, or the like, may be employed to transmit the driving force. The rotation of the electric motor 55 allows the revolutionary member 52 to rotate around the vertical shaft 51.

A restricting piece 56 is fixed to the enclosure 45 of the carriage 46. The restricting piece 56 is located on the movement path of the revolutionary member 52. The rotation of the revolutionary member 52 in either direction causes the revolutionary member 52 to finally collide against the restricting piece 56. The restricting piece 56 thus serves to prevent the revolutionary member 52 from rotating by a full around. The restricting piece 56 is positioned at a position rearward of the vertical shaft 51 on the longitudinal centerline intersecting with the axis of the vertical shaft 51.

First and second grasping finger assemblies 57a, 57b are mounted on the support member 47. Each of the grasping finger assemblies 57a, 57b is coupled to the support member 47 for relative rotation around a pivot 58. The pivot 58 extends in the vertical direction perpendicular to the horizontal plane. The first grasping finger assembly 57a includes a first arm member 61 extending in the lateral direction toward the pivot 58 of the second grasping finger assembly 57b. Likewise, the second grasping finger assembly 57b includes a second arm member 62 extending in the lateral direction toward the pivot 58 of the first grasping finger assembly 57a. A connecting shaft 63 is fixed to the tip end of the first arm member 61. The connecting shaft 63 stands upright in the vertical direction. An oblong opening 64 is formed at the tip end of the second arm member 62. The oblong opening 64 extends in the lateral direction. When the tip end of the second arm member 62 is overlaid on the tip end of the first arm member 61, the oblong opening 64 receives the connecting shaft 63. The tip ends of the first and second arm members 61, 62 are in this manner connected to each other. The connecting shaft 63 is located at an intermediate position equally spaced from the pivots 58, 58.

Grasping fingers 65, 66 are attached to the first and second arm members 61, 62, respectively. The grasping fingers 65, 66 extend forward from the first and second arm members 61, 62, respectively. The grasping fingers 65, 66 are spaced from each other in the lateral direction at a predetermined interval. A hook 67 is formed at the tip end of each of the grasping fingers 65, 66. The hooks 67 are designed to bend inward in the lateral direction from the corresponding grasping fingers 65, 66. The grasping fingers 65, 66 may be punched out of a metallic plate, for example. The grasping fingers 65, 66 maybe kept at a vertical attitude perpendicular to the horizontal plane.

The first and second arm members 61, 62 are allowed to swing around the pivots 58 between a backward position and a forward position, respectively. The first and second arm members 61, 62 at the backward positions keep their tip ends at reference positions. The first and second arm members 61, 62 at the forward positions keep their tip ends at positions forward of the reference positions. When the first and second arm members 61, 62 reach the forward positions, a space between the hooks 67, 67 gets larger or wider than the width of the magnetic tape cartridge 15. The magnetic tape cartridge 15 is thus allowed to enter the space between the hooks 67, 67. When the first and second arm members 61, 62 move from the forward positions to the backward positions, the hooks 67, 67 get closer to each other. The grasping fingers 65, 66 are in this manner driven to get closer to or remoter from each other.

An elastic member such as a compression spring 68 is connected to the support member 47 and the second arm member 62. The compression spring 68 serves to bring the second arm member 62 toward the backward position. The compression spring 68 exhibits an elasticity sufficient to keep the second arm member 62 at the backward position. When the second arm member 62 is forced to reach the backward position, the first arm member 61 is also allowed to reach the backward position with the assistance of the connecting shaft 63. The grasping fingers 65, 66 are in this manner kept closest to each other.

A cam member 69 is attached to the first arm member 61. The cam member 69 may be integral with the first arm member 61. The cam member 69 defines a first cam surface 71 and a second cam surface 72. The first cam surface 71 extends outward from the root end of the first arm member 61 toward the tip end of the first arm member 61. The second cam surface 72 extends from the outer boundary of the first cam surface 71 toward the tip end of the first arm member 61. The first and second cam surfaces 71, 72 are set perpendicular to the horizontal plane. When the first arm member 61 is set at the backward position, the first and second cam surfaces 71, 72 are located inside the elongated opening 54. The first cam surface 71 is designed to gradually get remoter from the contour of the elongated opening 54 at a position closer to the tip end of the first arm member 61. The second cam surface 72 is designed to get closer to the contour of the elongated opening 54 at a position closer to the tip end of the first arm member 61. The first cam surface 71 extends larger or wider than the second cam surface 72 in the lateral direction. In other words, the first cam surface 71 is formed as a moderate gradient, while the second cam surface 72 is formed as a sharp gradient, relative to the contour of the elongated opening 54.

Now, assume that the first robot hand 21 takes the magnetic tape cartridge 15 from one of the cells 14. The support member 47 is set at a standby position within the enclosure 45 of the carriage 46. The compression spring 68 serves to keep the first and second arm members 61, 62 at the backward positions. The grasping fingers 65, 66 are thus set closest to each other. The small shaft 53 is located within the elongated opening 54 in a space between the first or left end of the elongated opening 54 and the first cam surface 71.

Figure 5:
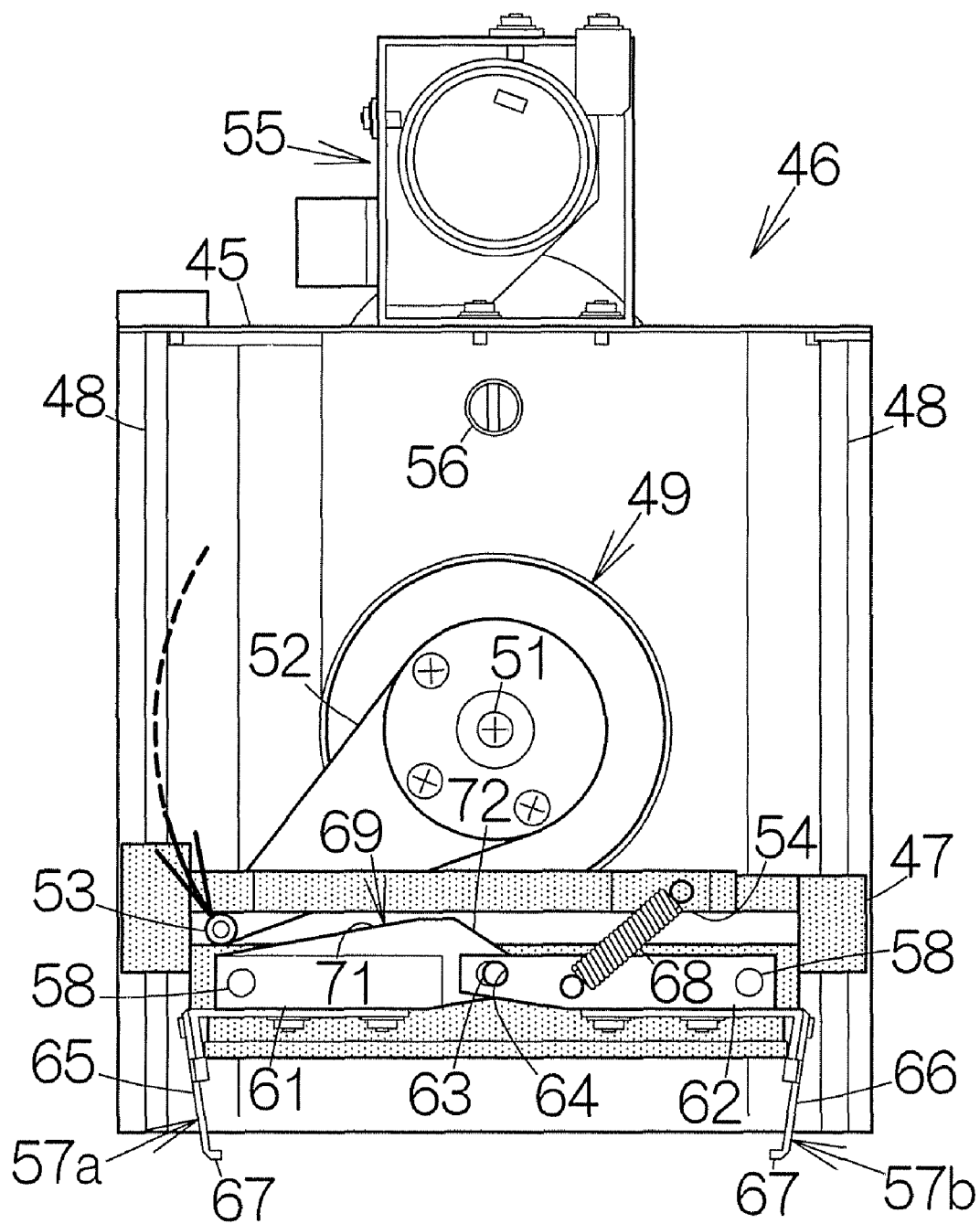
FIG. 5 is a plan view schematically illustrating the operation of the first or second robot hand.

When the first robot hand 21 gets opposed to the cell 14, the electric motor 55 allows the revolutionary member 52 to rotate around the vertical shaft 51 in the forward direction, as shown in FIG. 5. The rotation of the revolutionary member 52 allows the small shaft 53 to move forward. Since a relative movement is restrained between the small shaft 53 and the support member 47 in the longitudinal direction, the forward movement of the small shaft 53 causes the forward movement of the support member 47. The small shaft 53 is allowed to move in the lateral direction within the elongated opening 54, so that the small shaft 53 moves in the space between the left end of the elongated opening 54 and the first cam surface 71.

Figure 7:
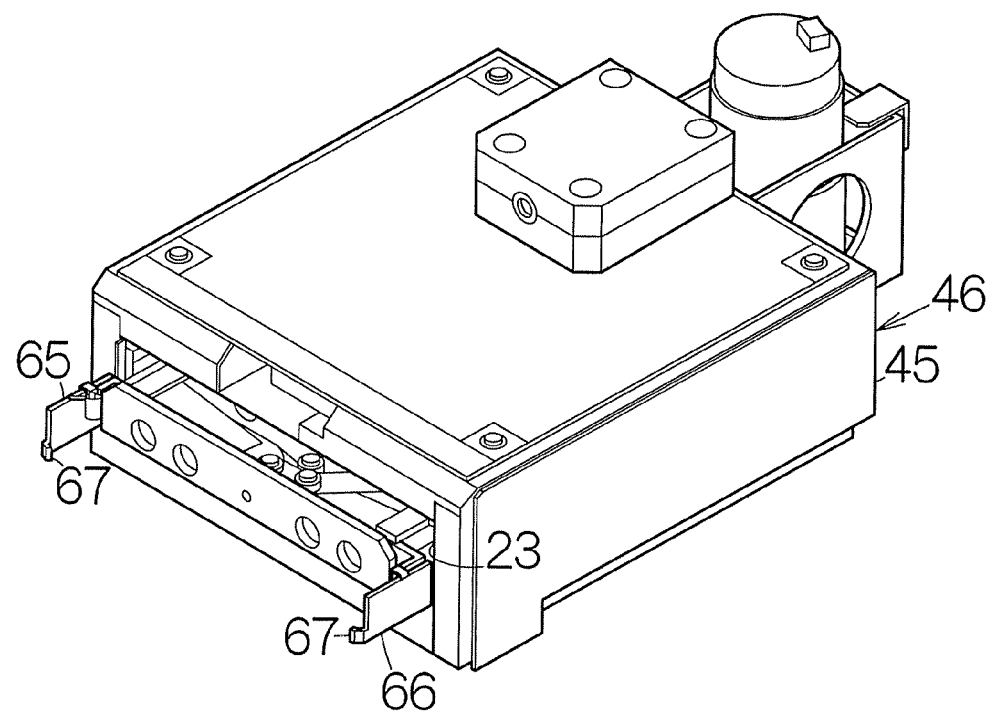
FIG. 7 is a perspective view schematically illustrating grasping fingers protruding from the enclosure of the robot hand.
Figure 6:
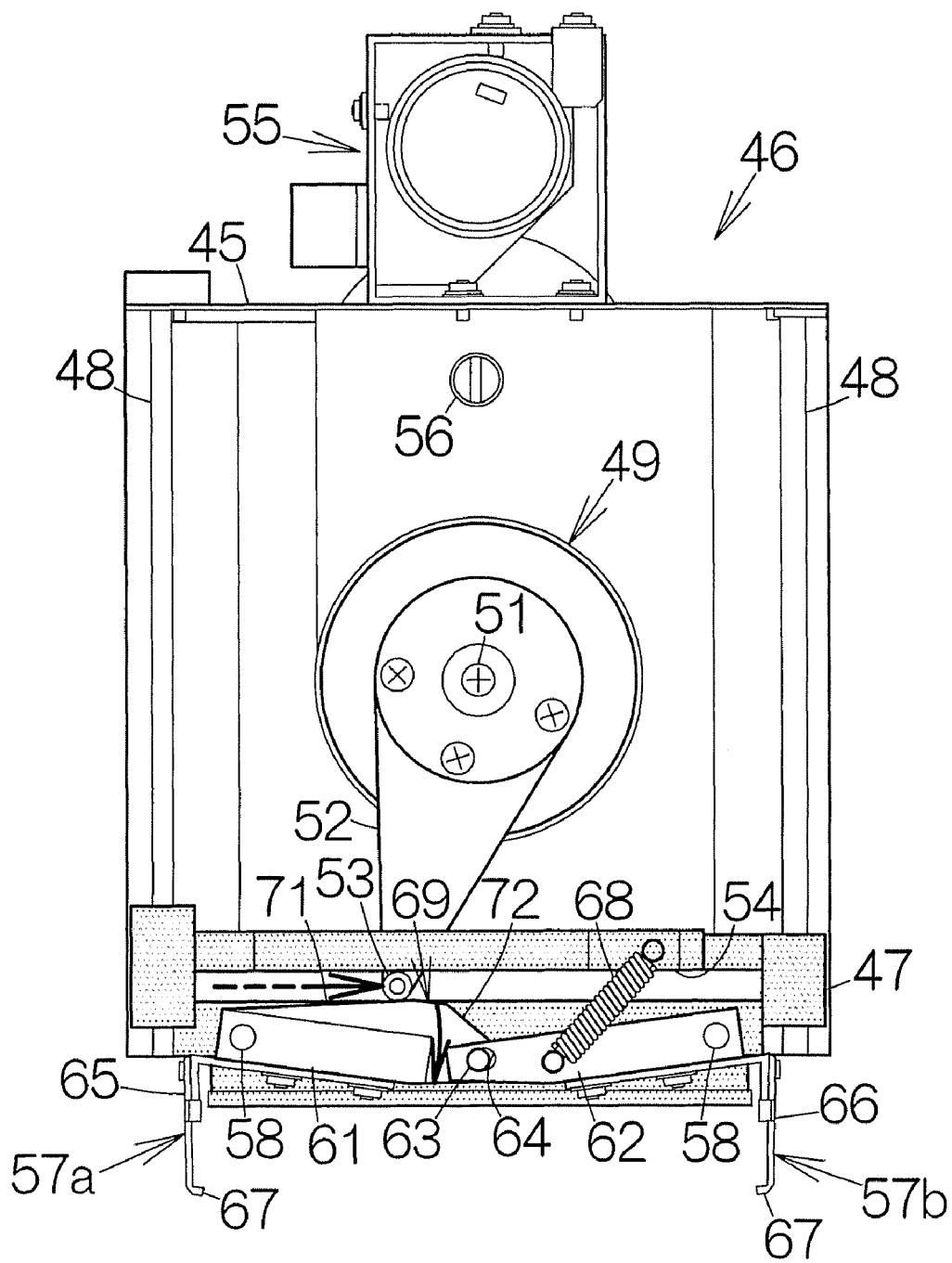
FIG. 6 is a plan view schematically illustrating the operation of the first or second robot hand.

A further rotation of the revolutionary member 52 allows the small shaft 53 to move within the elongated opening 54 from the left end toward the second or right end of the elongated opening 54. The small shaft 53 contacts with the first cam surface 71 on the first arm member 61, as shown in FIG. 6. Since the first cam surface 71 gradually gets remoter from the contour of the elongated opening 54 as mentioned above, the lateral movement of the small shaft 53 serves to drive the first arm member 61 around the pivot 58. The first arm member 61 is thus allowed to swing forward around the pivot 58 against the compressive force of the compression spring 68. This results in movement of the connecting shaft 63 around the pivot 58. The movement of the connecting shaft 63 allows the second arm member 62 to likewise swing forward around the pivot 58. The grasping fingers 65, 66 thus gradually get distanced from each other. Simultaneously, the grasping fingers 65, 66 get out of the enclosure 45 through the slot 23, as is apparent from FIG. 7. The magnetic tape cartridge 15 in the cell 14 is allowed to come into the space between the hooks 67, 67 of the grasping fingers 65, 66.

Figure 8:
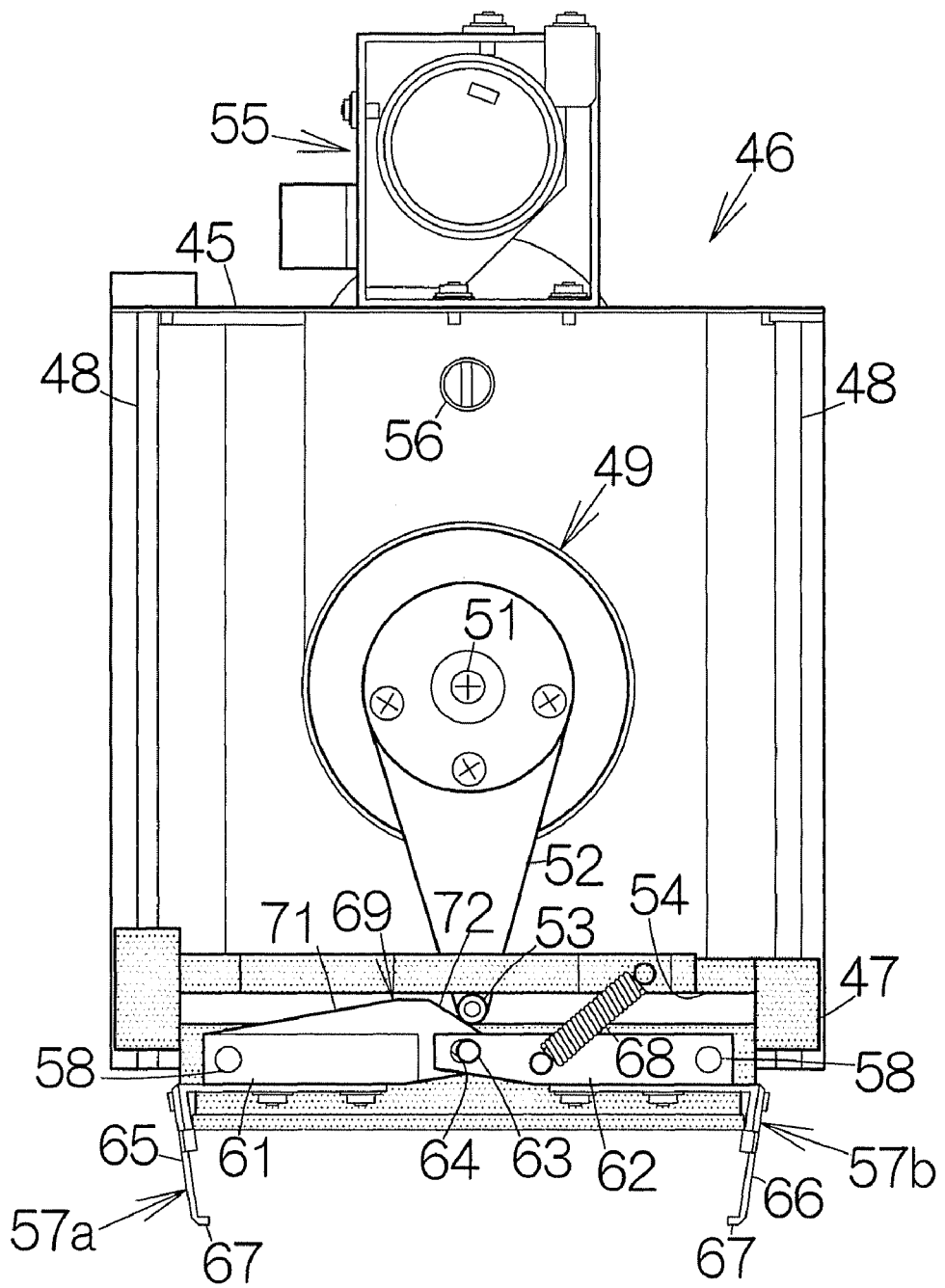
FIG. 8 is a plan view schematically illustrating the operation of the first or second robot hand.

A further rotation of the revolutionary member 52 causes the contact of the small shaft 53 with the cam member 69 to transit from the first cam surface 71 to the second cam surface 72. When the small shaft 53 have moved across the second cam surface 72, the small shaft 53 reaches the intermediate position in the lateral direction in the elongated opening 54, as shown in FIG. 8. The support member 47 is brought to the foremost position. The compression spring 68 forces the first and second arm members 61, 62 to immediately get back to the backward positions. The hooks 67, 67 of the grasping fingers 65, 66 thus get closer to each other. The magnetic tape cartridge 15 is in this manner held between the grasping fingers 65, 66. The hooks 67 engage with receiving openings defined in the magnetic tape cartridge 15. The compressive force of the compression spring 68 acts on the grasping fingers 65, 66. The compressive force enables the first robot hand 21 to firmly hold the magnetic tape cartridge 15.

Figure 9:
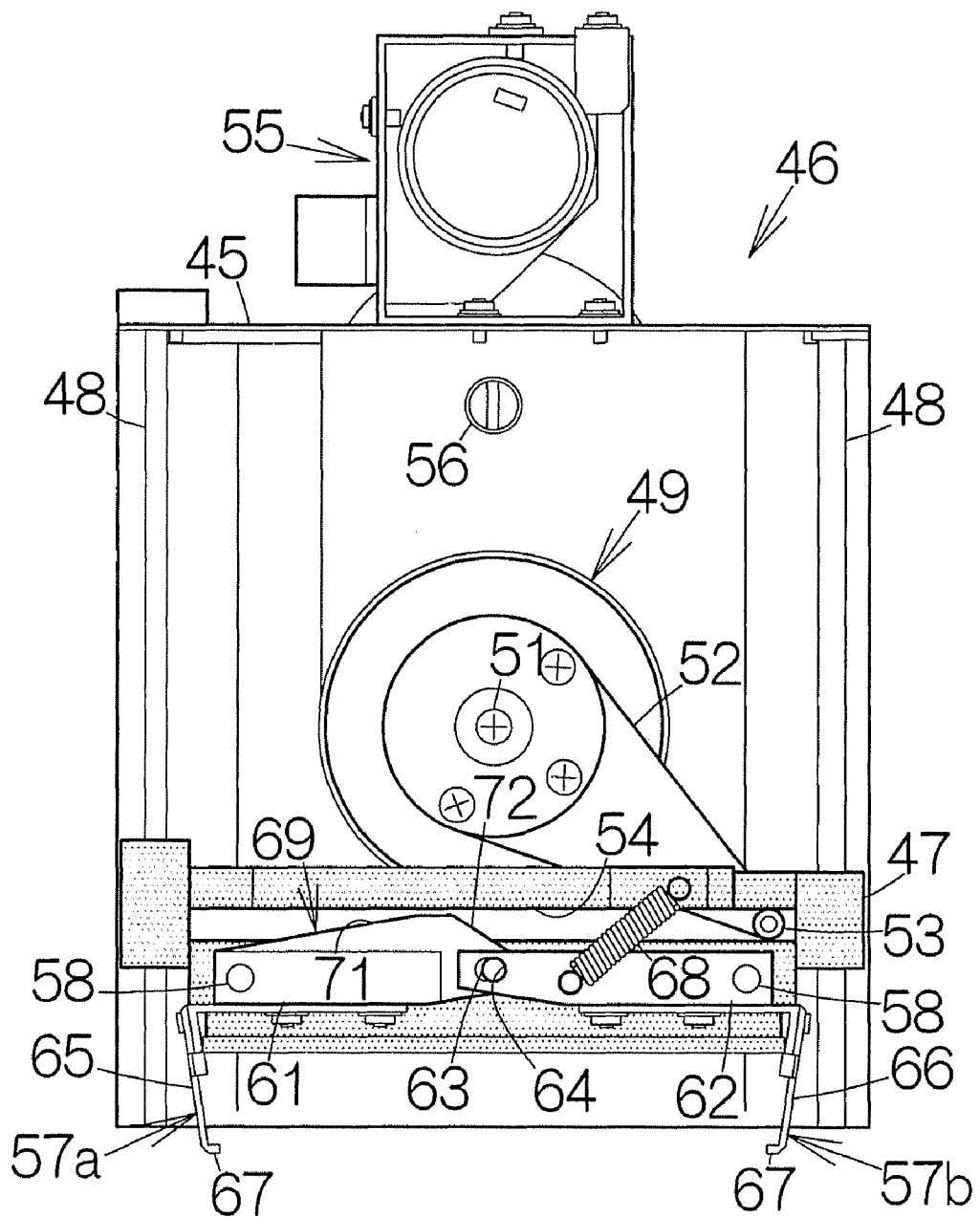
FIG. 9 is a plan view schematically illustrating the operation of the first or second robot hand.

A further rotation of the revolutionary member 52 allows the small shaft 53 to move within the elongated opening 54 from the intermediate position toward the right end, as shown in FIG. 9. The support member 47 gradually recedes. The grasping fingers 65, 66 are allowed to move into the slot 23. The magnetic tape cartridge 15 is thus taken into the slot 23.

Figure 10:
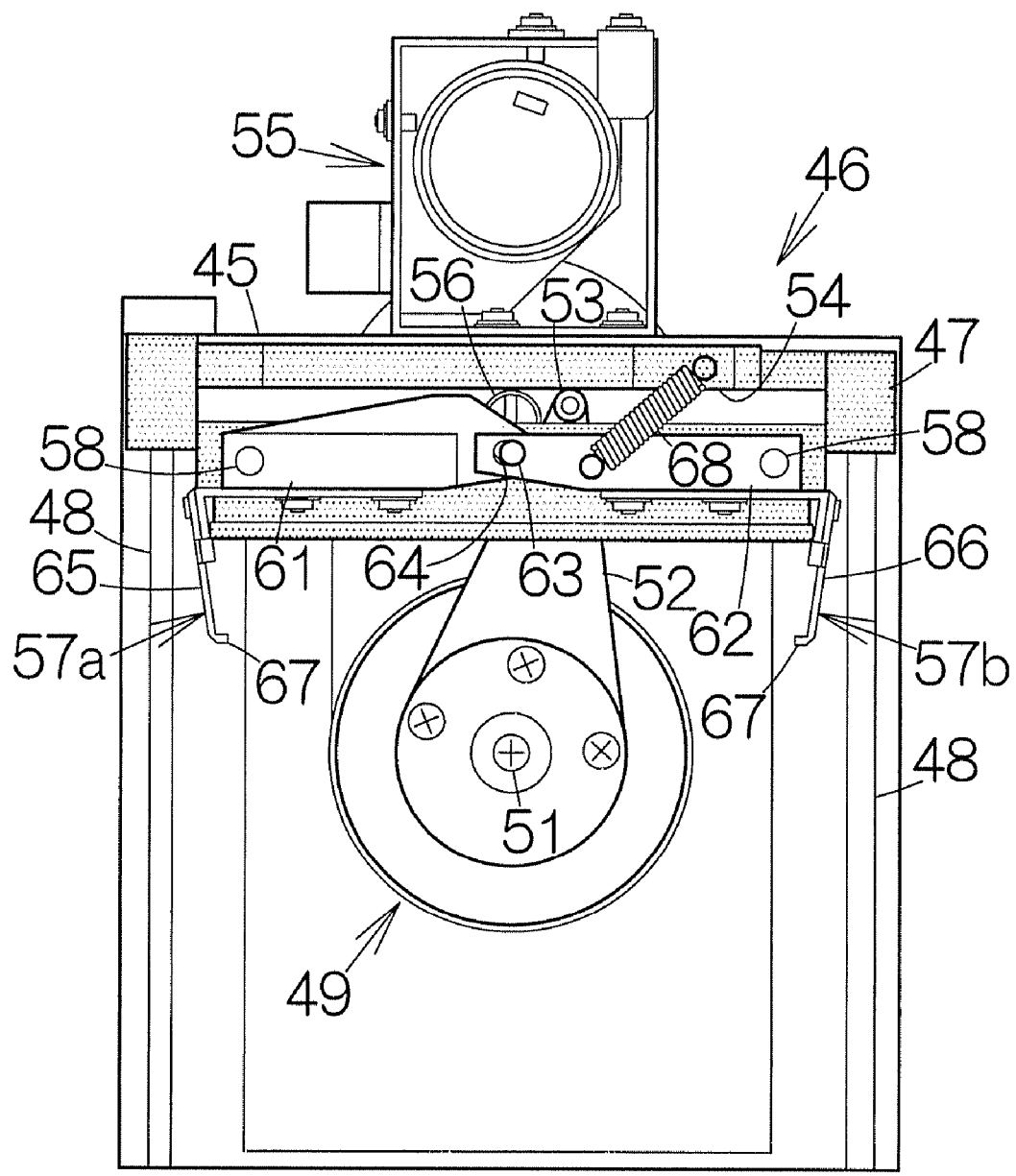
FIG. 10 is a plan view schematically illustrating the operation of the first or second robot hand.

The revolutionary member 52 keeps rotating until the revolutionary member 52 contact with the restricting piece 56. When the revolutionary member 52 contacts with the restricting piece 56, the support member 47 recedes farthest in the longitudinal direction, as shown in FIG. 10. The rearmost position of the support member 47 is in this manner established. The magnetic tape cartridge 15 is completely contained within the enclosure 45. The first robot hand 21 then starts the transportation of the magnetic tape cartridge 15.

When the magnetic tape cartridge 15 is discharged out of the carriage 46, the revolutionary member 52 is driven to rotate around the vertical shaft 51 in the direction opposite to the aforementioned direction. The rotation of the revolutionary member 52 allows the small shaft 53 to move forward. When the small shaft 53 advances farthest, the support member 47 also advances farthest, as shown in FIG. 8. The small shaft 53 contacts with the second cam surface 72. A further rotation of the revolutionary member 52 allows the small shaft 53 to move within the elongated opening 54 in the lateral direction from the intermediate position toward the left end. The lateral movement of the small shaft 53 serves to drive the first arm member 61 to swing around the pivot 58. The first arm member 61 is allowed to swing forward around the pivot 58 against the compressive force of the compression spring 68. This results in movement of the connecting shaft 63 around the pivot 58. The movement of the connecting shaft 63 allows the second arm member 62 to likewise swing forward around the pivot 58. The grasping fingers 65, 66 thus gradually get distanced from each other. The hooks 67 are disengaged from the magnetic tape cartridge 15.

A further rotation of the revolutionary member 52 allows the support member 47 to gradually recede into the slot 23. The magnetic tape cartridge 15 thus gradually gets out of the space between the grasping fingers 65, 66. The hooks 67 of the grasping fingers 65, 66 simultaneously get closer to each other. When the grasping fingers 65, 66 completely recede from the magnetic tape cartridge 15, namely the cell 14, the grasping fingers 65, 66 are set closest. A further rotation of the revolutionary member 52 then allows the support member 47 to return to the standby position within the enclosure 45.

Figure 11:
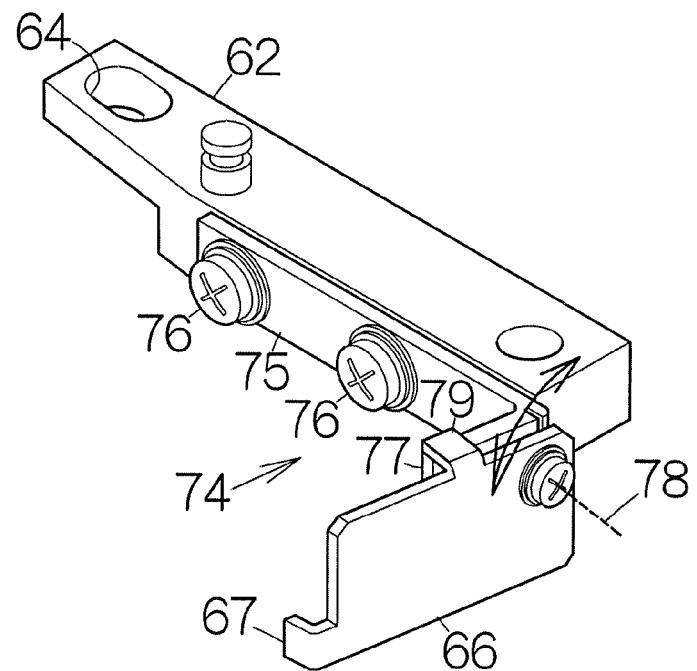
FIG. 11 is an enlarged perspective view schematically illustrating the structure of a swaying mechanism.

A swaying mechanism 74 is incorporated in the grasping finger assembly 57a, 57b between the first arm member 61 and the grasping finger 65 as well as between the second arm member 62 and the grasping finger 66, respectively. As shown in FIG. 11, the swaying mechanism 74 includes an attachment base 75 fixed to the front surface of the second arm member 62 in the grasping finger assembly 57b. Screws 76 may be employed to fix the attachment base 75, for example.

A support piece 77 is formed in the attachment base 75. The support piece 77 is designed to extend forward from the front surface of the second arm member 62. The grasping finger 66 is attached to the support piece 77 for relative rotation around a rotation axis 78 extending in the lateral direction along the horizontal plane. A stop 79 is formed in the grasping finger 66. The stop 79 extends in parallel with the rotation axis 78. The stop 79 is designed to trace the movement path around the rotation axis 78. The support piece 77 intersects the movement path of the stop 79. The stop 79 is allowed to contact with the support piece 77 to restrain the rotation of the grasping finger 66 around the rotation axis 78. The contact of the stop 79 with the support piece 77 allows the grasping finger 66 to take a reference attitude. When the grasping finger 66 takes the reference attitude, the tip end of the grasping finger 66, namely the hook 67 reaches the foremost position.

Figure 12:
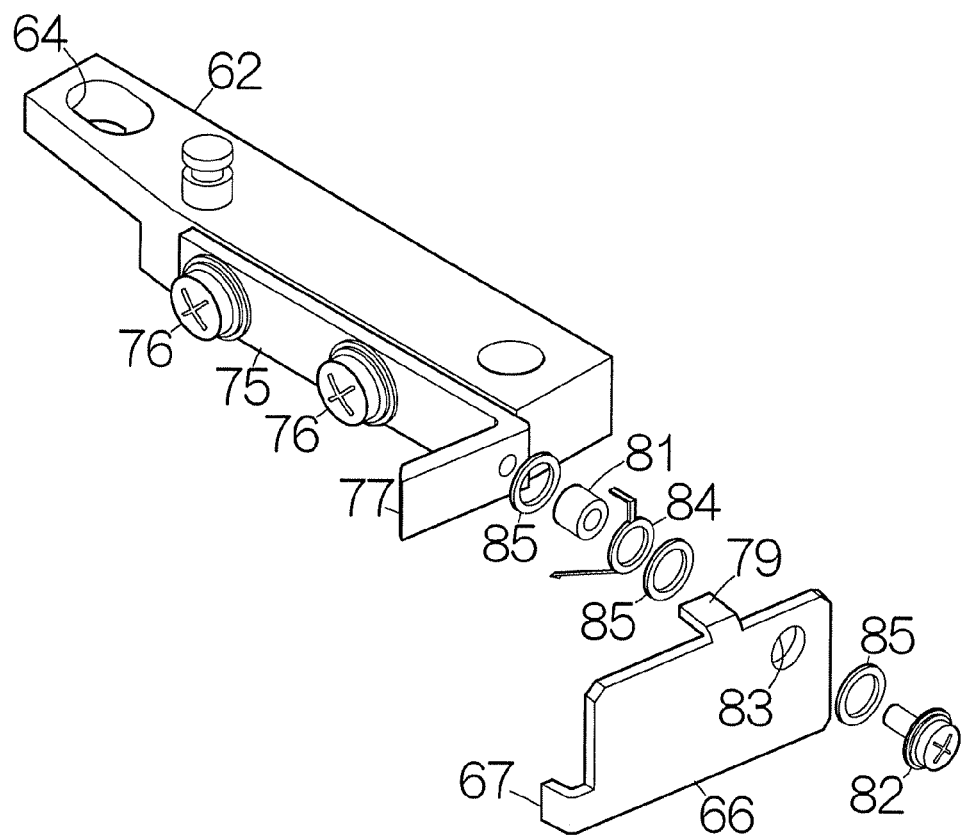
FIG. 12 is an exploded view schematically illustrating the structure of the swaying mechanism.

As shown in FIG. 12, a bush 81 is fixed to the support piece 77. The bush 81 functions as a support shaft according to the present invention. A screw 82 is screwed into the support piece 77 for the fixation of the bush 81. The bush 81 is interposed between the head of the screw 82 and the support piece 77. The grasping finger 66 is mounted on the bush 81 between the head of the screw 82 and the support piece 77. A through hole 83 is formed in the grasping finger 66 to receive the bush 81. A torsion coil spring 84 is likewise mounted on the bush 81 between the grasping finger 66 and the support piece 77. The torsion coil spring 84 exhibits a driving force for rotation around the rotation axis 78 or bush 81 in one direction. The driving force in this direction enables the downward movement of the hook 67. The driving force comprising an elastic torsional force serves to keep the grasping finger 66 at the reference attitude. A spacer 85 is inserted between the support piece 77 and the torsion coil spring 84, between the torsion coil spring 84 and the grasping finger 66 and between the grasping finger 66 and the head of screw 82, respectively. It should be noted that the grasping finger assembly 57a likewise includes the swaying mechanism identical to the described one.

Figure 13:
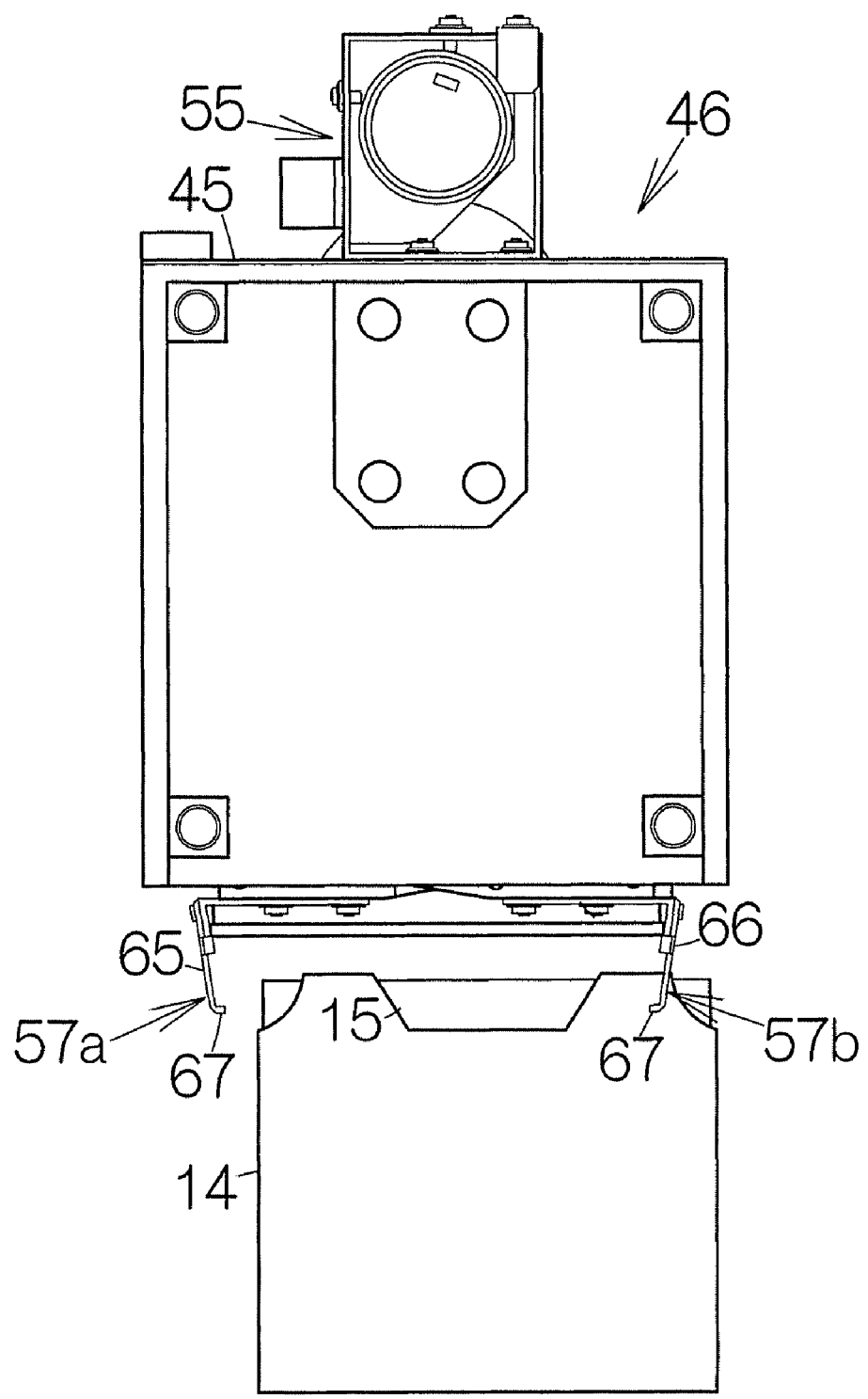
FIG. 13 is a plan view schematically illustrating the robot hand colliding against a cell.
Figure 14:
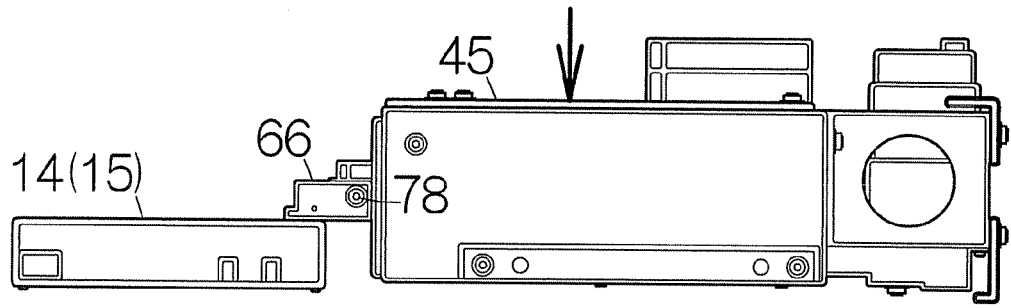
FIG. 14 is a side view schematically illustrating the operation of the swaying mechanism.
Figure 15:
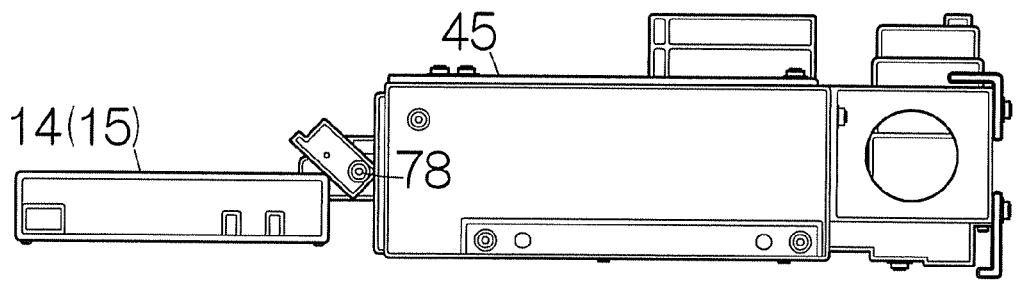
FIG. 15 is a side view schematically illustrating the operation of the swaying mechanism.

Now, assume that the grasping finger 66 contacts with the cell 14 or the magnetic tape cartridge 15 within the cell 14 during the transfer of the first robot hand 21 after the first robot hand 21 has malfunctioned, as shown in FIG. 13, for example. Here, the first robot hand 21 keeps moving irrespective of the contact of the grasping finger 66 with the cell 14, as shown in FIG. 14. In other words, the second transporting robot 19 keeps driving the first rail base 28 and the guide member 27 of the first transporting robot 18 along the first rail 26. The first robot hand 21 receives a downward driving force. The grasping finger 66 is forced to rotate upward around the rotation axis 78 based on the reaction to the cell 14, as shown in FIG. 15.

Figure 16:
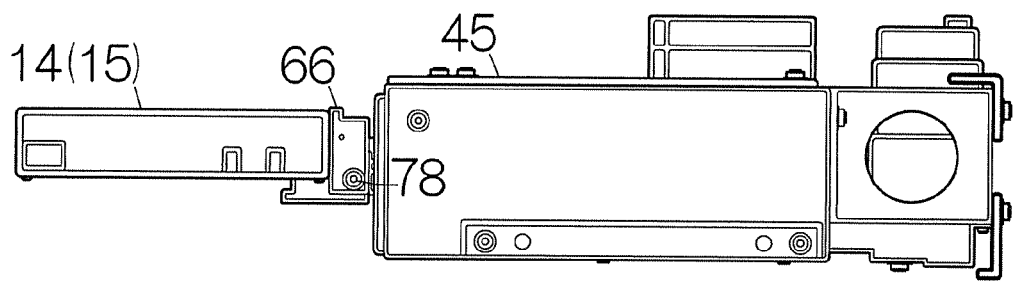
FIG. 16 is a side view schematically illustrating the operation of the swaying mechanism.
Figure 17:
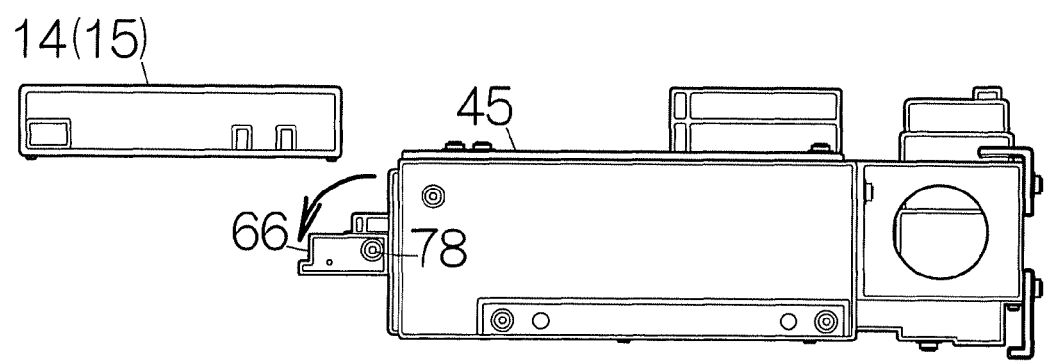
FIG. 17 is a side view schematically illustrating the operation of the swaying mechanism.

When the upright attitude of the grasping finger 66 is established, the grasping finger 66 is completely released from the cell 14, as shown in FIG. 16. The first robot hand 21 is thus allowed to keep moving downward. The grasping finger 66 in this manner avoids interference with the cell 14 or the magnetic tape cartridge 15. When the grasping finger 66 has passed by the cell 14, the grasping finger 66 is allowed to return to the reference attitude based on the elastic force of the torsion coil spring 84, as shown in FIG. 17. The first robot hand 21 can in this manner reliably reach the standby region 42.

What is claimed is:

1. A library apparatus, comprising:
a storage box including cells;
a carriage;
a positioning mechanism positioning the carriage at locations corresponding to the cells within an operating region adjacent to a predetermined standby region;
a backup carriage;
a backup positioning mechanism configured to position the backup carriage at the locations corresponding to the cells within the operating region, and to drive the carriage toward the predetermined standby region, if the positioning mechanism malfunctions;
a support member mounted on the carriage, the support member moving in a longitudinal direction along an imaginary plane between a foremost position and a rearmost position;
a pair of attachment bases mounted on the support member, for rotation around corresponding rotation axes, respectively, perpendicular to a horizontal plane;
support shafts mounted on the attachment bases, respectively, the support shafts extending in a lateral direction along the horizontal plane;
a pair of grasping fingers mounted on the support shafts for relative rotation around axes of the support shafts, respectively, the grasping fingers being configured to rotate from a reference attitude in a specific direction, the grasping fingers taking the reference attitude to position tip ends of the grasping fingers at foremost positions in the longitudinal direction, respectively;
a driving mechanism mounted on the support member, the driving mechanism driving the attachment bases around the corresponding rotation axes so that the tip ends of the grasping fingers get closer to and are distanced from each other in the lateral direction;
stops formed in the grasping fingers, respectively, the stops being received on the attachment bases in response to the relative rotation of the grasping fingers in the specific direction, respectively, to establish the reference attitude of the grasping fingers; and
elastic members exhibiting driving forces biasing the grasping fingers around the support shafts, respectively, in a direction opposite to the specific direction, to urge the stops against the attachment bases, so that the grasping fingers are configured to return to the reference attitude automatically.

2. A robot hand for a library apparatus, comprising:
a carriage;
a support member mounted on the carriage, said support member moving in a longitudinal direction along a plane between a foremost position and a rearmost position;
a pair of attachment bases mounted on the support member, for rotation around corresponding rotation axes, respectively, perpendicular to a horizontal plane;
support shafts mounted on the attachment bases, respectively, the support shafts extending in a lateral direction along the horizontal plane;
a pair of grasping fingers mounted on the support shafts for relative rotation around axes of the support shafts, respectively, the grasping fingers being configured to rotate from a reference attitude in a specific direction, the grasping fingers taking the reference attitude to position tip ends of the grasping fingers at foremost positions in the longitudinal direction, respectively;
a driving mechanism mounted on the support member, the driving mechanism driving the attachment bases around the corresponding rotation axes so that the tip ends of the grasping fingers get closer to and are distanced from each other in the lateral direction;
stops formed in the grasping fingers, respectively, the stops being received on the attachment bases in response to the relative rotation of the grasping fingers in the specific direction, respectively, to establish the reference attitude of the grasping fingers; and
elastic members exhibiting driving forces biasing the grasping fingers around the support shafts, respectively, in a direction opposite to the specific direction, to urge the stops against the attachment bases, so that the grasping fingers are configured to return to the reference attitude automatically.

* * * * *